United States Patent [19]

Wu

[11] Patent Number: 5,744,934
[45] Date of Patent: Apr. 28, 1998

[54] POWER SUPPLY DEVICE

[75] Inventor: Michael Wu, Taipei Hsien, Taiwan

[73] Assignee: Formosa Electronic Industries Inc., Taipei Hsien, Taiwan

[21] Appl. No.: 873,237

[22] Filed: Jun. 11, 1997

[51] Int. Cl.[6] .................................................. H02M 1/00
[52] U.S. Cl. ........................ 320/111; D13/107; 363/146; 307/150
[58] Field of Search ........................... 320/111; D13/138, D13/107, 110; 363/146; 307/150; 439/170, 171, 172, 173

[56] References Cited

U.S. PATENT DOCUMENTS

| 3,458,794 | 7/1969 | Bohnstedt et al. | 320/111 |
|---|---|---|---|
| 4,109,193 | 8/1978 | Schulteis | 320/111 |
| 4,543,624 | 9/1985 | Rumble | 363/146 |
| 4,875,152 | 10/1989 | Foster | 363/146 |
| 4,954,940 | 9/1990 | Chandler et al. | 363/146 |
| 5,160,879 | 11/1992 | Tortola et al. | 320/111 |
| 5,297,015 | 3/1994 | Miyazaki et al. | 363/146 |
| 5,615,103 | 3/1997 | Steindam | 363/146 |
| 5,635,814 | 6/1997 | Afzal et al. | 320/111 |
| 5,648,712 | 7/1997 | Hahn | 320/111 |
| 5,684,689 | 11/1997 | Hahn | 363/146 |
| 5,689,413 | 11/1997 | Jaramillo et al. | 363/146 |

*Primary Examiner*—Edward Tso
*Assistant Examiner*—Gregory J. Toatley, Jr.
*Attorney, Agent, or Firm*—Beveridge, DeGrandi, Weilacher & Young LLP

[57] ABSTRACT

A power supply device including a casing, a cover plate covered on the casing, an electronic exchanging type power circuit assembly mounted in the casing and adapted for dropping DC voltage and changing AC voltage, a DC power plug and an AC power plug adapted for alternatively mounting on the top cover for connecting DC power supply from a socket for cigarette lighter of a car or AC power supply from an AC power supply outlet to the electronic exchanging type power circuit assembly, the cover plate having a rectangular top chamber extended to one end, DC terminals and AC terminals mounted in the rectangular top chamber and respectively connected to the electronic exchanging type power circuit assembly for receiving DC power supply through the DC power plug or AC power supply through the AC power plug, the casing having spring-supported stop means adapted for stopping the AC power plug or DC power plug in the rectangular top chamber of the cover plate.

1 Claim, 7 Drawing Sheets

POWER SUPPLY DEVICE

BACKGROUND OF THE INVENTION

The present invention relates to power supply devices, and more particularly to such a power supply device which has a chamber at a cover plate thereof for alternatively mounting different power plugs for obtaining AC power supply when in the house, or DC car battery power supply when outside the house.

When traveling abroad, one may carry a variety of personal electric apparatus such as mobile telephone, electric shaver, mobile CD-player, notebook computer, etc. When the battery power of a personal electric apparatus is low, it must be quickly charged by a battery charger. However, because different countries may define different specifications for power plugs and power supply outlets, the power plug of the prepared battery charger may not fit the specifications of local power supply outlets. Even if the power plug of the prepared battery charger fits the specifications of local power supply outlets, the working range of the battery charger may not match with the voltage of local AC power supply. In order to fit different specifications and different voltage ranges, an adapter may be used. However, an adapter for this purpose is heavy, not convenient for carrying with oneself. Furthermore, conventional power supply devices are commonly designed for converting AC power supply into DC power supply. These power supply devices cannot obtain DC power supply from for example a socket for cigarette lighter of a car. If to obtain DC power supply from a socket for cigarette lighter, a special power adapter shall be used.

SUMMARY OF THE INVENTION

The present invention has been accomplished to provide a power supply device which eliminates the aforesaid problems. It is one object of the present invention to provide a power supply device which can be alternatively mounted with different power plugs to fit different specifications of power supply outlets. It is another object of the present invention to provide a power supply device which is practical for converting different AC power supply into the desired DC power supply. It is still another object of the present invention to provide a power supply device which can process AC power supply as well as DC power supply into the desired working voltage. To achieve these and other objects of the present invention, there is provided a power supply device which comprises a casing, a cover plate covered on the casing, an electronic exchanging type power circuit assembly mounted in the casing and adapted for dropping DC voltage and changing AC voltage, a DC power plug and an AC power plug adapted for alternatively mounting on the top cover for connecting DC power supply from a socket for cigarette lighter of a car or AC power supply from an AC power supply outlet to the electronic exchanging type power circuit assembly, the cover plate having a rectangular top chamber extended to one end, DC terminals and AC terminals mounted in the rectangular top chamber and respectively connected to the electronic exchanging type power circuit assembly for receiving DC power supply through the DC power plug or AC power supply through the AC power plug, the casing having spring-supported stop means adapted for stopping the AC power plug or DC power plug in the rectangular top chamber of the cover plate. The AC power plug can be made in any of a variety of forms to fit different specifications.

DETAILED DESCRIPTION OF THE PREFERRED EMBODIMENT

Figure 1:
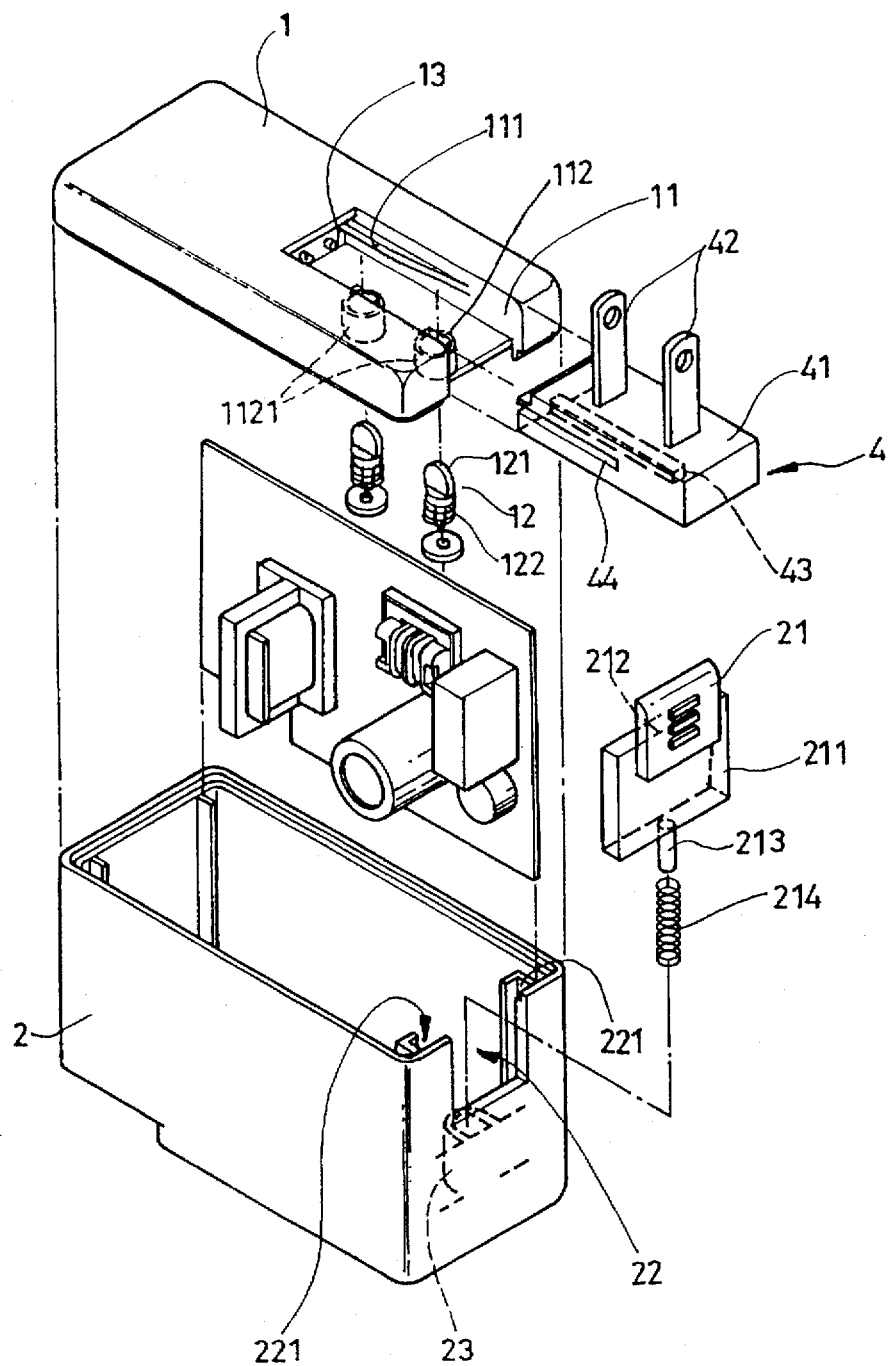
FIG. 1 is an exploded view of a power supply device according to one embodiment of the present invention.
Figure 2:
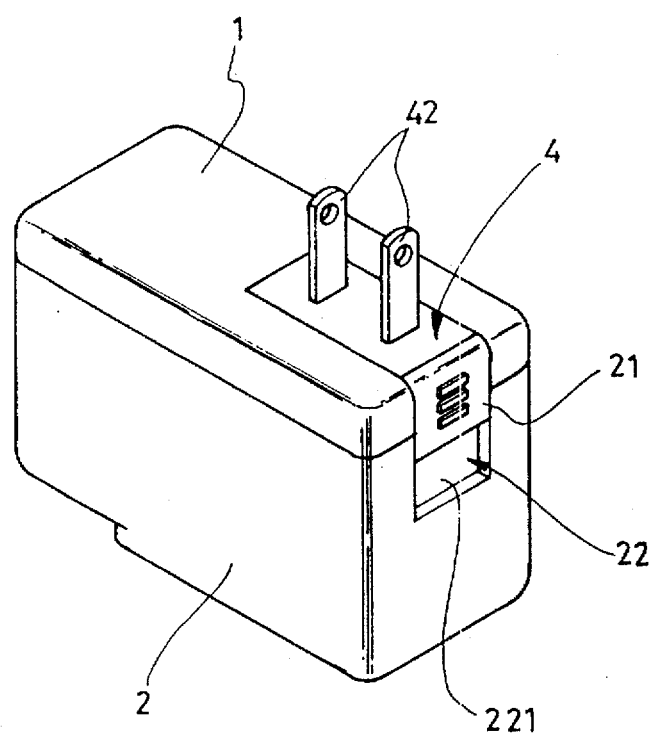
FIG. 2 is an elevational view of the power supply device shown in FIG. 1.
Figure 3:
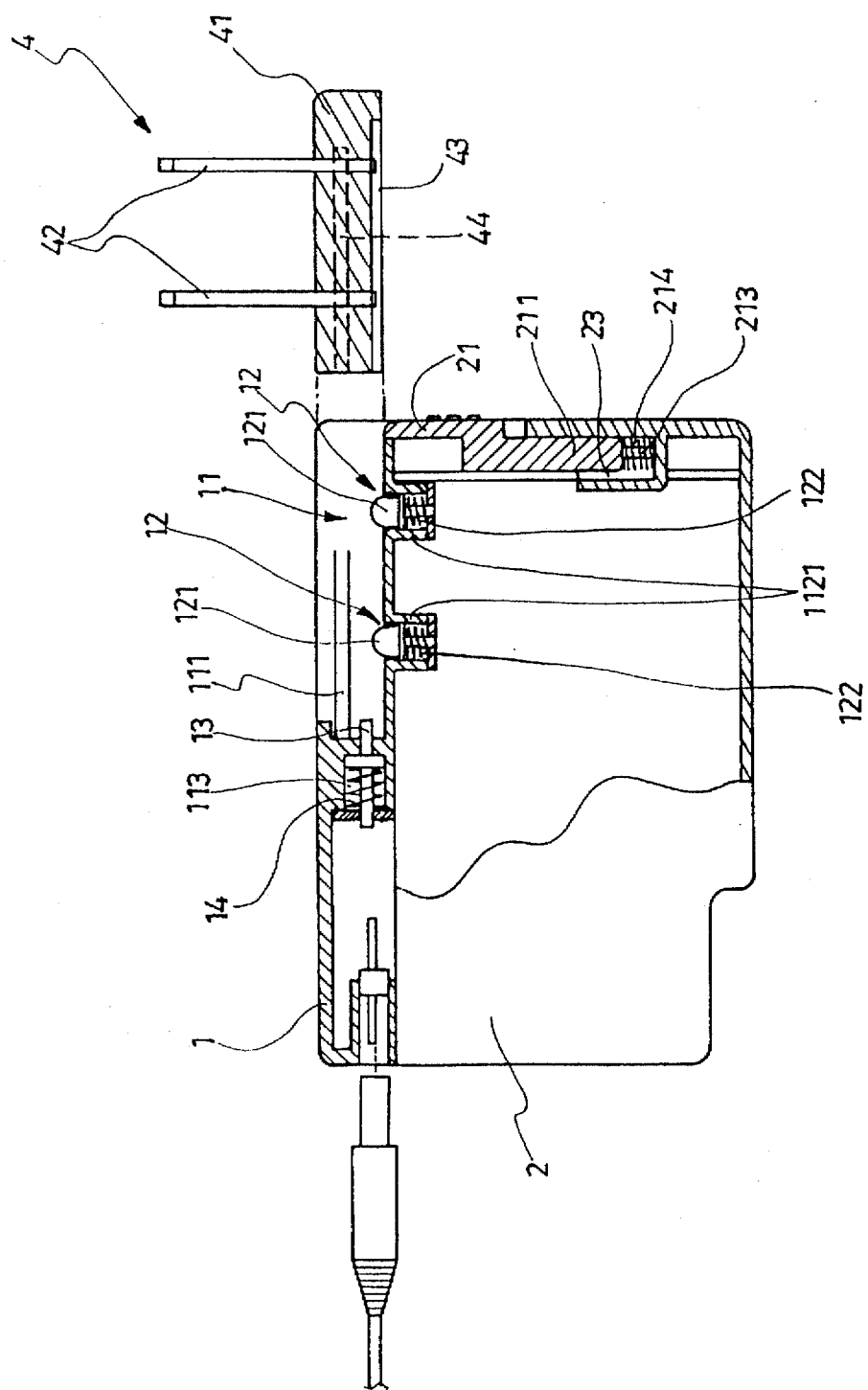
FIG. 3 is a sectional view in an enlarged scale of the power supply device shown in FIG. 2, showing the AC power plug removed from the cover plate.
Figure 4:
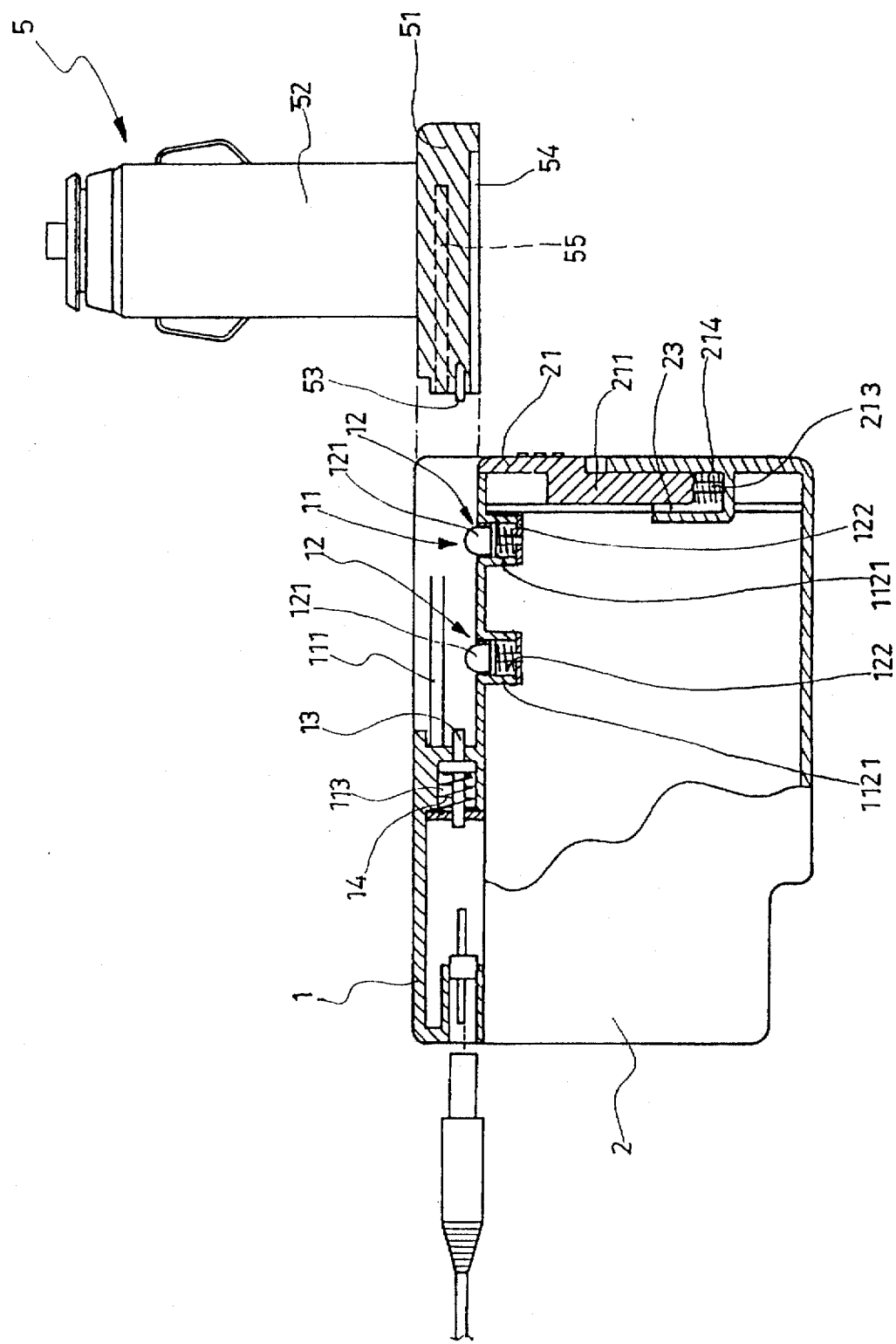
FIG. 4 is a sectional view of the present invention, showing the power supply device matched with a DC power plug.

Referring to FIGS. 1, 2, 3 and 4, a power supply device in accordance with the present invention is generally comprised of a casing 2, a cover plate 1 covered on the casing 2, an electronic exchanging type power circuit assembly 3 mounted inside the casing 2 and adapted for dropping DC voltage and changing AC voltage, an AC power plug 4 and a DC power plug 5 adapted for mounting on the cover plate 1 alternatively.

Referring to FIGS. 1 and 3 again, the cover plate 1 comprises a rectangular top chamber 11 longitudinally extended from one end thereof, two bevel tongues 111 bilaterally and longitudinally disposed inside the rectangular top chamber 11, two vertical oblong holes 112 longitudinally spaced in the middle inside the rectangular top chamber 11, two spring holders 1121 respectively disposed below the rectangular holes 112, two first spring elements 122 respectively mounted in the spring holders 1121, two AC terminals 12 respectively supported on the first spring elements 122 and having a respective contact tip 121 projecting through the vertical oblong holes 112 into the rectangular top chamber 11, two horizontal holes 113 disposed at an inner side of the rectangular top chamber 11 and spaced between the bevel tongues 111, two second spring elements 14 respectively mounted in the horizontal holes 113, and two DC terminals 13 respectively mounted in the horizontal holes 113 and supported on the second spring elements 14. The second spring elements 14 impart an outward pressure to the DC terminals 13, causing them to partially project into the rectangular top chamber 11. The AC terminals 12 and the DC terminals 13 are respectively connected to the power circuit assembly 3.

Figure 5:
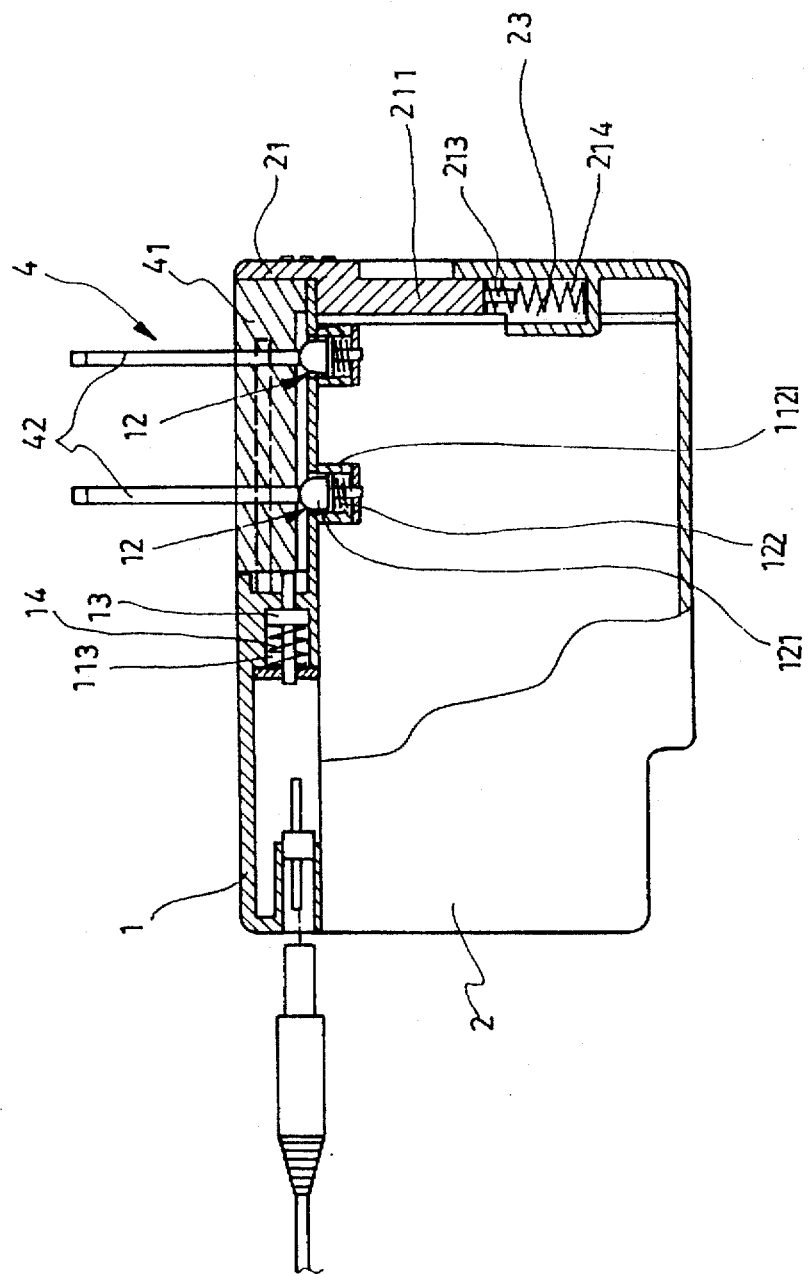
FIG. 5 is similar to FIG. 3 but showing the Ac power plug installed.

Referring to FIG. 5 and FIGS. from 1 to 3 again, the AC power plug 4 and the DC power plug 5 are to be alternatively mounted in the rectangular top chamber 11 of the cover plate 1. The AC power plug 4 comprises a rectangular base 41 fitting the rectangular top chamber 11 of the cover plate 1 and having a longitudinal bottom groove 43 at its bottom side and two longitudinal coupling grooves 44 at its two opposite lateral sides, and two metal blades 42 perpendicularly fastened to the rectangular base 41 and adapted for connecting to an AC power supply outlet and having a respective bottom end projecting into the longitudinal bottom groove 43. When the rectangular base 41 of the AC power plug 4 is inserted into the rectangular top chamber 11 of the cover plate 1, the longitudinal coupling grooves 44 of the rectangular base 41 are forced into engagement with the bevel tongues 111 of the cover plate 1, and the bottom ends of the metal blades 42 are respectively forced into contact with the contact tips 121 of the AC terminals 12 (see FIG.

5). Because the bottom ends of the metal blades 42 are disposed in the longitudinal bottom groove 43, it will not easily be touched to cause an electric shock when the AC power plug 4 is connected to an AC power supply outlet by a child.

Figure 7:
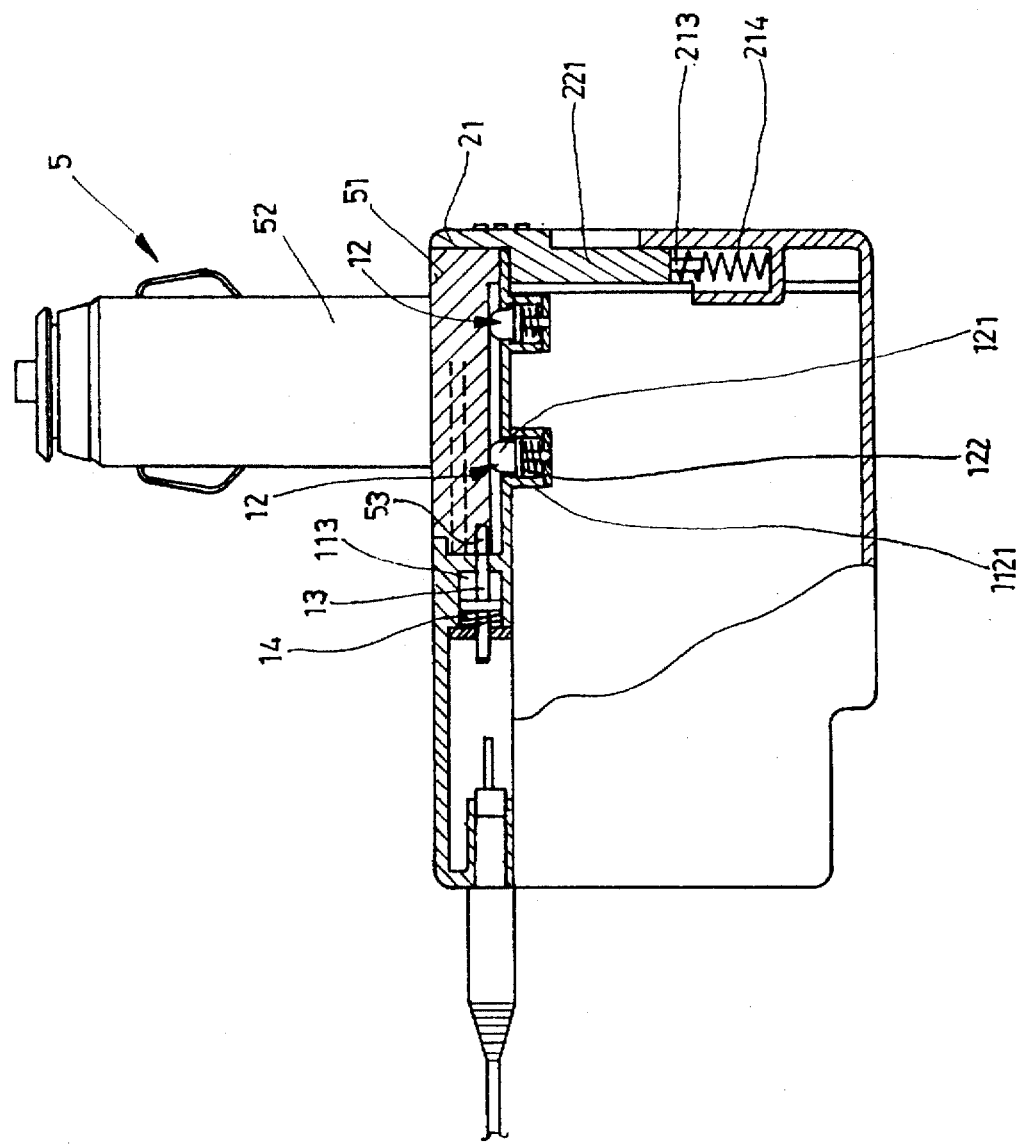
FIG. 7 is similar to FIG. 4 but showing the DC power plug installed.

Referring to FIG. 7 and FIG. 4 again, the DC power plug 5 comprise a rectangular base 51 fitting the rectangular top chamber 11 of the cover plate 1 and having a longitudinal bottom groove 54 at its bottom side and two longitudinal coupling grooves 55 at its two opposite lateral sides, two metal contacts 53 spaced at its front side, and a plug body 52 perpendicularly raised from the top of the rectangular base 41 with its center and side contacts respectively connected to the metal contacts 53 and adapted for connecting to for example a socket for cigarette lighter of a motor vehicle. When the rectangular base 51 of the DC power plug 5 is inserted into the rectangular top chamber 11 of the cover plate 1, the longitudinal coupling grooves 55 of the rectangular base 51 are forced into engagement with the bevel tongues 111 of the cover plate 1, and the metal contacts 53 are respectively forced into contact with the DC terminals 13 (see FIG. 7).

Referring to FIGS. from 1 to 3 again, the casing 2 comprises a side opening 22 at one short side thereof, two vertical tracks 221 behind the side opening 22, a receptacle 23 on the inside between the vertical tracks 221, a spring 214 mounted in the receptacle 23, a guide block 211 moved in between the vertical tracks 221 and having a bottom rod 213 supported on the spring 214, and a stop plate 21 fixedly fastened to the guide block 211 at an outer side and defining with the topmost edge of the guide block 211 a shoulder 212. When the guide block 211 is mounted in between the tracks 221, the bottom rod 213 is supported on the spring 214, and the stop plate 21 is suspended in the side opening 22 of the casing 2 and stopped at one end of the cover plate 1 to block the entrance of the rectangular top chamber 11. When the stop plate 21 is pressed down, the rectangular top chamber 11 is opened, and the AC power plug 4 can then be inserted into the rectangular top chamber 11 of the casing 1. When the rectangular base 41 of the AC power plug 4 is inserted into the rectangular top chamber 11 of the cover plate 1 to force its longitudinal coupling grooves 44 into engagement with the bevel tongues 111 of the cover plate 1, the metal blades 42 of the AC power plug 4 are respectively forced into contact with the contact tips 121 of the AC terminals 12 (see FIG. 5), and therefore the AC power plug 4 is electrically connected to the electronic exchanging type power circuit assembly 3. After the installation of the AC power plug 4, the stop plate 21 is released from the hand, permitting it to be moved back to its former position by the spring force of the spring 214, and therefore the AC power plug 4 is stopped in the rectangular top chamber 11 of the cover plate 1 by the stop plate 21. When the AC power plug 4 is connected to an AC power supply outlet, AC power supply is transmitted to the electronic exchanging type power circuit assembly 3, and converted by it into the desired DC power supply.

Figure 6:
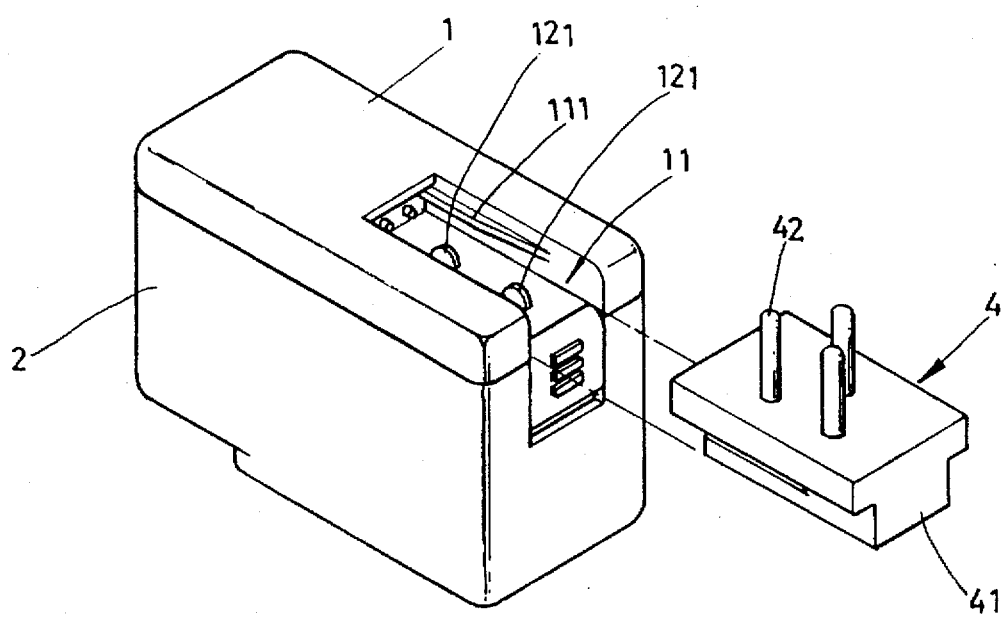
FIG. 6 shows an alternate form of the AC power plug according to the present invention.

The AC power plug 4 may be variously embodied to fit different specifications from different countries. For example, the AC power plug 4 can be made having an invertedly disposed T-shaped base 41 and three metal blades 42 (including one grounding prong) raised from the T-shaped base 41 (see FIG. 6).

Referring to FIG. 7, when AC power supply is not available, the AC power plug 4 is removed from the cover plate 1, and then the DC power plug 5 is fastened to the cover plate 1 for connecting the power supply device to for example a socket for cigarette lighter of a motor vehicle to obtain DC power supply from it. When the DC power plug 5 is installed, the metal contacts 53 are respectively forced into contact with the DC terminals 13, therefore the plug body 53 is electrically connected to the electronic exchanging type power circuit assembly 3. When the plug body 53 is connected to a socket for cigarette lighter of a motor vehicle to obtain car battery power supply from it, DC car battery power supply is transmitted from the socket for cigarette lighter of the motor vehicle to the electronic exchanging type power circuit assembly 3 and dropped by it to the desired voltage level.

Furthermore, the output end of the electronic exchanging type power circuit assembly 3 can be connected to charging terminals of a rechargeable battery of a mobile telephone or electric appliance.

It is to be understood that the drawings are designed for purposes of illustration only, and are not intended as a definition of the limits and scope of the invention disclosed.

What the invention claimed is:

1. A power supply device comprising a casing having a top open side, a cover plate covered on the top open side of said casing, an electronic exchanging type power circuit assembly mounted in said casing and adapted for dropping DC power supply to a predetermined voltage level and converting AC power supply into DC power supply, a DC power plug adapted for mounting on said top cover for connecting DC power supply from a DC power source to said electronic exchanging type power circuit assembly, and an AC power plug adapted for mounting on said top cover for connecting city power supply from an AC power supply outlet to said electronic exchanging type power circuit assembly, wherein:

said cover plate comprises a rectangular top chamber having an entrance at one end, two bevel tongues bilaterally and longitudinally disposed inside said rectangular top chamber, two vertical oblong holes longitudinally spaced inside said rectangular top chamber in the middle, two spring holders respectively disposed below said rectangular holes, two first spring elements respectively mounted in said spring holders, two AC terminals respectively supported on said first spring elements and connected to said electronic type power circuit assembly and having a respective contact tip projecting through said vertical oblong holes into said rectangular top chamber, two horizontal holes disposed at an inner side of said rectangular top chamber and spaced between said bevel tongues, two second spring elements respectively mounted in said horizontal holes, and two DC terminals respectively mounted in said horizontal holes and supported on said second spring elements and connected to said electronic exchanging type power circuit assembly;

said AC power plug comprises a rectangular base adapted to be inserted through said entrance into said rectangular top chamber of said cover plate and having a longitudinal bottom groove at a bottom side thereof and two longitudinal coupling grooves at two opposite lateral sides thereof for coupling to the bevel tongues of said cover plate, and two metal blades perpendicularly fastened to the rectangular base of said AC power plug and adapted for connecting to an AC power supply outlet and having a respective bottom end projecting into the longitudinal bottom groove of the rectangular base of said AC power plug, the bottom ends of said metal blades being respectively forced into contact with the AC terminals of said top cover when the rectangular base of said AC power plug is inserted into the rectangular top chamber of said cover plate;

said DC power plug comprise a rectangular base adapted to be inserted through said entrance into said rectangular top chamber of said cover plate and having a longitudinal bottom groove at a bottom side thereof and two longitudinal coupling grooves at two opposite lateral sides thereof for coupling to the bevel tongues of said top cover, two metal contacts spaced at a front side thereof which are respectively forced into contact with the DC terminals of said top cover when the rectangular base of said DC power plug is inserted into the rectangular top chamber of said cover plate, and a plug body perpendicularly raised from the rectangular base of said DC power plug and connected to said DC terminals and adapted for receiving DC power supply from a socket for cigarette lighter of a motor vehicle;

said casing comprises a side opening at one short side thereof, two vertical tracks behind said side opening, a receptacle on the inside between said vertical tracks, a spring mounted in said receptacle, a guide block moved in between said vertical tracks and having a bottom rod supported on the spring in said receptacle, and a stop plate fixedly fastened to said guide block at an outer side and defining with the topmost edge of said guide block a shoulder, the spring in said receptacle imparting an upward pressure to said guide block, causing said stop plate to block said entrance of said rectangular top chamber of said cover plate.

* * * * *